United States Patent
Merkel et al.

(10) Patent No.: US 9,821,661 B2
(45) Date of Patent: Nov. 21, 2017

(54) DEVICE AND METHOD FOR OPERATING AN ELECTRIC MACHINE

(71) Applicant: Robert Bosch GmbH, Stuttgart (DE)

(72) Inventors: Tino Merkel, Schwieberdingen (DE); Andreas Koenig, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/105,682

(22) PCT Filed: Nov. 14, 2014

(86) PCT No.: PCT/EP2014/074590
§ 371 (c)(1),
(2) Date: Jun. 17, 2016

(87) PCT Pub. No.: WO2015/090755
PCT Pub. Date: Jun. 25, 2015

(65) Prior Publication Data
US 2016/0303978 A1 Oct. 20, 2016

(30) Foreign Application Priority Data
Dec. 19, 2013 (DE) .................. 10 2013 226 560

(51) Int. Cl.
*H02K 29/10* (2006.01)
*B60L 3/04* (2006.01)
(Continued)

(52) U.S. Cl.
CPC .................. *B60L 3/04* (2013.01); *H02P 3/18* (2013.01); *H02P 23/0027* (2013.01);
(Continued)

(58) Field of Classification Search
CPC ....... B60W 10/08; H02K 29/12; H02K 29/08; H02K 29/10; H02P 6/14; H02P 6/16; G05B 11/28
(Continued)

(56) References Cited

U.S. PATENT DOCUMENTS 5,731,669 A * 3/1998 Shimizu .............. B60L 11/1807
    318/139
5,874,818 A * 2/1999 Schuurman ....... H02M 7/53873
    318/280
(Continued)

FOREIGN PATENT DOCUMENTS

CN        102257724       11/2011
DE        102007020509    11/2008
(Continued)

OTHER PUBLICATIONS

International Search Report for Application No. PCT/EP2014/074590 dated Feb. 9, 2015 (English Translation, 3 pages).

*Primary Examiner* — Rina Duda
(74) *Attorney, Agent, or Firm* — Michael Best & Friedrich LLP

(57) ABSTRACT

The invention results in improved switching from the idling mode to an active short circuit mode of an electric machine. According to the invention, the switch from the idling mode to the active electric short circuit mode is delayed until predefined voltage conditions have been reached on the external terminals of an electric machine or until the rotor of the electric machine is in a predetermined position corresponding to the required voltage conditions.

7 Claims, 3 Drawing Sheets

(51) Int. Cl.
*H02P 3/18* (2006.01)
*H02P 23/00* (2016.01)
*H02P 29/024* (2016.01)
*H02P 27/06* (2006.01)

(52) U.S. Cl.
CPC .......... *H02P 27/06* (2013.01); *H02P 29/0241* (2016.02); *Y02T 10/642* (2013.01)

(58) Field of Classification Search
USPC ...... 318/400.37, 400.38, 400.39, 400.4, 599, 318/139
See application file for complete search history.

(56) References Cited

U.S. PATENT DOCUMENTS

| | | | |
|---|---|---|---|
| 6,850,424 B2* | 2/2005 | Baudelot | H02M 5/4585 363/37 |
| 7,279,862 B1 | 10/2007 | Welchko et al. | |
| 7,489,097 B2* | 2/2009 | Fu | B60K 6/26 318/400.01 |
| 7,498,761 B2* | 3/2009 | Iwashita | H02P 29/032 318/609 |
| 8,319,460 B2* | 11/2012 | Son | H02P 6/20 318/254.1 |
| 2005/0248306 A1* | 11/2005 | Chen | H02P 25/03 318/712 |
| 2010/0202089 A1* | 8/2010 | Kuehner | B60L 3/0023 361/30 |
| 2011/0095713 A1* | 4/2011 | Son | H02P 6/20 318/400.11 |

FOREIGN PATENT DOCUMENTS

| | | |
|---|---|---|
| DE | 102012002023 | 12/2012 |
| DE | 102012101508 | 8/2013 |
| WO | 2013023807 | 2/2013 |
| WO | 2013068158 | 5/2013 |

* cited by examiner

DEVICE AND METHOD FOR OPERATING AN ELECTRIC MACHINE

The present invention relates to a device and a method for operating an electric machine. The present invention particularly relates to a method for operating an electric machine for switching from an idling mode to a short circuit mode.

Electric machines, such as, for example, permanently excited synchronous machines, are used in numerous technical fields. Such permanently excited synchronous machines are, for example, used in motor vehicles. For safety reasons, provisions must be taken for the event of a failure in an operating state. An option to set such an operating state is the so-called idling mode. In making such an adjustment, all connections of the electric machine are disconnected from one another and an active actuation of the electric machine with voltage does not take place. A further safe operating state is the so-called active short circuit. In this case, the connections of the electric machine are short circuited by means of suitable switching elements.

The German patent application DE 10 2012 010 508 A1 discloses a device and a method for short circuiting a permanently excited synchronous machine, wherein the machine is short circuited by converter valves. If a voltage in an intermediate circuit of the actuating circuit of the electric machine deviates from a limit value, the converter valves are then opened again and the machine is subsequently operated in the idling mode.

There is a need for a device and a method which facilitates switching from the idling mode into the operating state of an active short circuit of an electric machine in a manner that is as safe and gentle as possible.

BACKGROUND OF THE INVENTION

To this end, the present invention provides a device for operating an electric machine comprising an inverter, which is designed to electrically separate the connections of the electric machine from one another in an idling mode and to electrically connect the connections of the electric machine to one another in a short circuit mode; wherein the inverter is furthermore designed to then switch from the idling mode to the short circuit mode if an electrical voltage has a predetermined value at the connections of the electric machine.

The present invention further provides a method for operating an electric machine, comprising the following steps: operating the electric machine in an idling mode, determining an electrical voltage at the connections of the electric machine, and short circuiting the connections of the electric machine if the electrical voltage has a predetermined value at said connections of the electric machine.

The concept underlying the present invention is to limit the switch from an idling mode to an active short circuit mode of an electric machine to precisely defined parameters. A switch from the idling mode to the active short circuit mode results only if defined voltage conditions are present at the connections of the electric machine. In this way, transient phase currents occurring when switching from the idling mode to the active short circuit mode can be reduced. This reduction of the phase currents has a positive effect on the service life of the components in the actuating circuit for the electric machine. In addition, the components used in said circuit can be of lighter construction and therefore more cost effective due to the expected phase currents being reduced. The reduced transient phase currents also have a positive effect on the sizing and the service life of the electric machine itself.

The voltage values and thus the parameters at which the electric machine is to be switched from the idling mode to the active short circuit mode can be determined in advance. As a result, the inventive switch from the idling mode to the active short circuit mode can be very easily carried out without inducing disproportionately large phase currents in the process.

According to one exemplary embodiment, the device further comprises a voltage sensor, which is designed to detect the electric voltage at the connections in the electric machine. The switch from the idling mode to the short circuit mode then occurs if the electrical voltage, which was detected in this manner, at the connections of the electric machine has a predetermined value. As a result, the switch from the idling mode to the active short circuit mode can be especially easily initiated.

According to one exemplary embodiment, the device further comprises a rotary encoder, which is designed to detect an angular position of the rotor of the electric machine, wherein the electrical voltage at the connections of the electric machine is determined on the basis of the angular position of the rotor of the electric machine. By means of the rotary encoder, an inference can be made about the position of the rotor and therefore about the voltage conditions at the connections of the electric machine in the idling mode. Hence, a direct determination of the voltage conditions at the electrical connections is not necessary. Nevertheless, an efficient and gentle switch from the idling mode to the short circuit mode can be implemented in this manner.

According to one exemplary embodiment, the inverter is designed to then switch from the idling mode to the short circuit mode if the amount of voltage is at a maximum in one strand. If an AC voltage is applied to the strands of the electric machine, a particularly gentle switch from the idling mode to the active short circuit mode can take place especially if one of these AC voltages has just reached a maximum value.

According to one exemplary embodiment, The inverter comprises a plurality of semiconductor switches, the electrical connections being electrically connected to one another via the semiconductor switches in the short circuit mode. Furthermore, the semiconductor switches preferably each comprise a freewheeling diode that is connected in parallel. Such semiconductor switches are particularly well suited for actuating an electric machine and also for actuating the electric machine in the freewheeling mode as well as in the active short circuit mode.

According to one exemplary embodiment, the present invention relates to an electric drive device comprising an electric machine and a device according to the invention for operating an electric machine.

According to one exemplary embodiment, the electric machine comprises a permanently excited synchronous machine.

According to a further exemplary embodiment, the present invention comprises a motor vehicle having an electric drive system, which comprises a device according to the invention for operating an electric machine. According to a further exemplary embodiment, the method for operating an electric machine further comprises a step for detecting a request for short circuiting the connections of the electric machine, wherein, upon receiving the request, the step for actuating the electric machine delays the short circuiting until the voltage at the connections of the electric machine has the predetermined value.

BRIEF DESCRIPTION OF THE DRAWINGS

Further embodiments and advantages of the invention ensue from the following description with reference to the attached drawings.

In the drawings.

DETAILED DESCRIPTION

Figure 1:
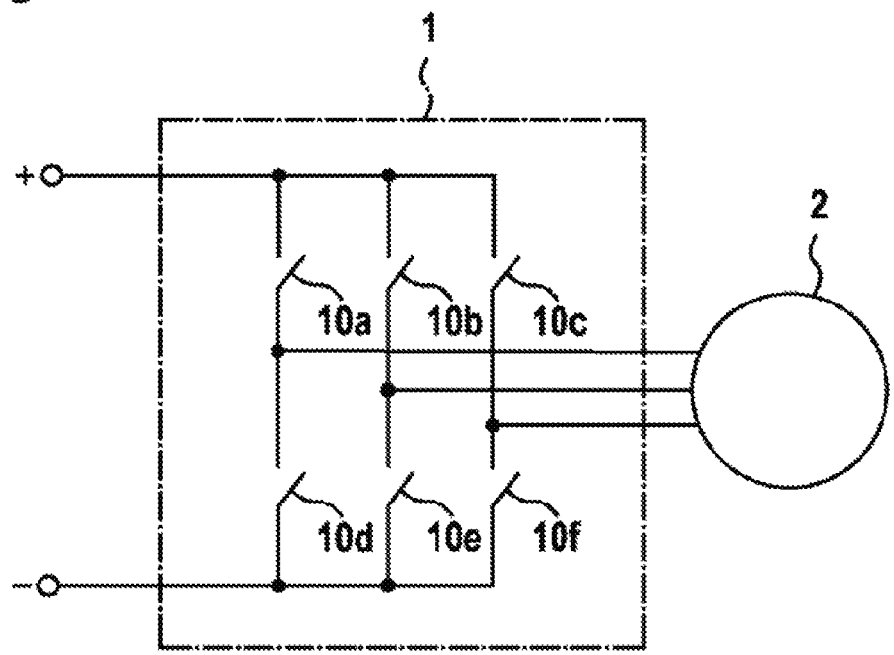
FIG. 1: shows a schematic depiction of an actuation of an electric machine in the idling mode.

FIG. 1 shows a schematic depiction for the actuation of an electric machine 2 in the idling mode. The electric machine 2 can, for example, relate to a permanently excited synchronous machine. In this exemplary embodiment, as is the case in the succeeding embodiments, the three-phase control of an electric machine. In principle, the control of electric machines having a number of phases which differs therefrom is, however, also possible.

The electric machine 2 is supplied with electrical energy by an inverter 1. The inverter 1 can thereby relate to an inverter comprising a B6 bridge. This inverter 1 is supplied with a DC voltage. For example, the DC voltage source, which supplies this inverter 1, relates to a battery, such as, for example, the traction battery of an electric vehicle. Other DC voltage sources or even an AC-DC converter are also possible for supplying the inverter 1.

In the exemplary embodiment depicted in this FIG. 1, the electric machine 2 is operated in the idling mode by means of the inverter 1. In this idling mode, all switching elements 10a-10f are open. A freewheeling diode (not depicted here) is preferably connected in each case to each of the switching elements 10a-10f. A current flow may therefore further be possible across these freewheeling diodes.

Figure 2:
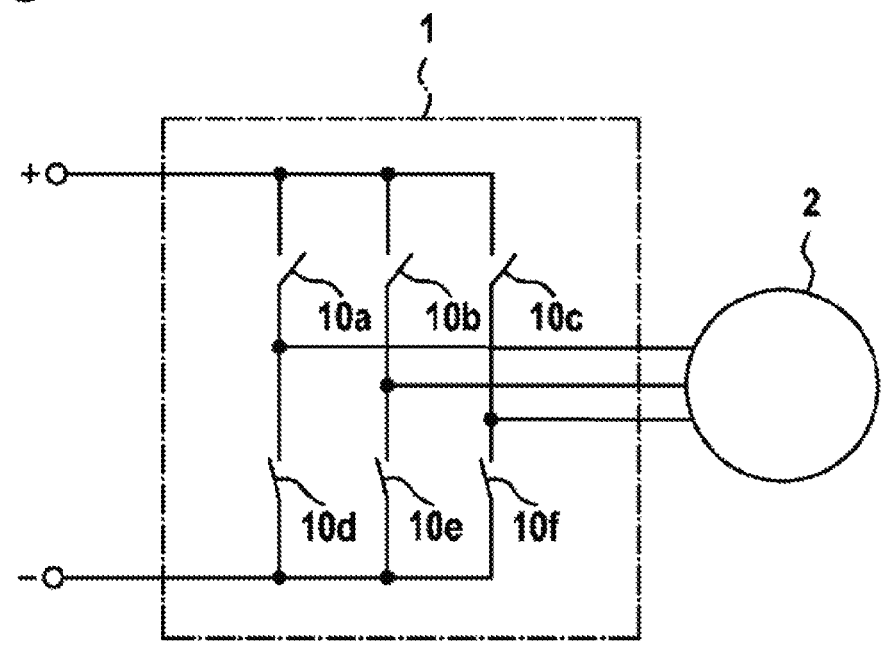
FIG. 2 shows a schematic depiction of an actuation of an electric machine in the short circuit mode according to a first exemplary embodiment.

FIG. 2 shows a schematic depiction of an actuation of the electric machine in an active short circuit mode. The wiring of the electric machine 2 by means of the inverter 1 is analogous to the wiring in FIG. 1. The active short circuit depicted here relates to a so-called lower active short circuit (uAKS), in which the three lower switching elements 10d-10f are closed while the upper three switching elements 10a-10c are open. All connections of the electric machine 2 are electrically connected to one another and thus short circuited by means of this switching state. Because the upper switching elements 10a-10c are open, a short circuit of the DC voltage source on the input side does not occur.

Figure 3:
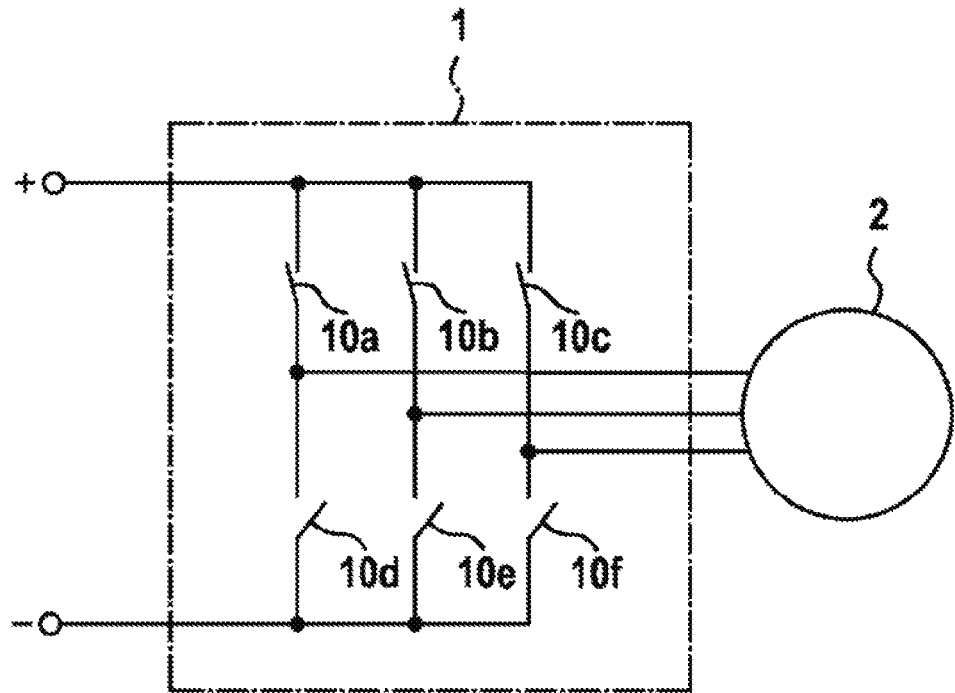
FIG. 3 shows a schematic depiction of an actuation of an electric machine in the short circuit mode according to a further exemplary embodiment.

FIG. 3 shows an alternative embodiment for an active short circuit mode. In this exemplary embodiment, the upper three switching elements 10a-10c are closed, whereas the lower three switching elements 10d-10f remain open. In this way, all terminals of the electric machine 2 are electrically connected to one another and thus short circuited.

Furthermore, an active short circuit mode is also possible by all existing switching elements 10a-10f being closed. In this case, it must, however, be ensured by means of further circuitry measures that a short circuit of the DC voltage applied to the input of the inverter 1 does not occur.

When switching from the idling mode according to FIG. 1 to the active short circuit mode according to FIG. 2 or 3, more or less large transient phase currents can occur depending on the voltage or current conditions. High transient phase currents have, however, a negative effect on the components of the inverter and on the electric machine.

By a suitable selection of the switching points in time for switching from the idling mode to the active short circuit mode, these transient phase currents can, however, be reduced. Due to the physical relationships between the phase currents and the voltage conditions at the connections of the electric machine, it has been proven to be especially advantageous to carry out the switch from the idling mode to the active short circuit mode if the amount of voltage in a strand of the electric machine has a maximum value.

Figure 4:
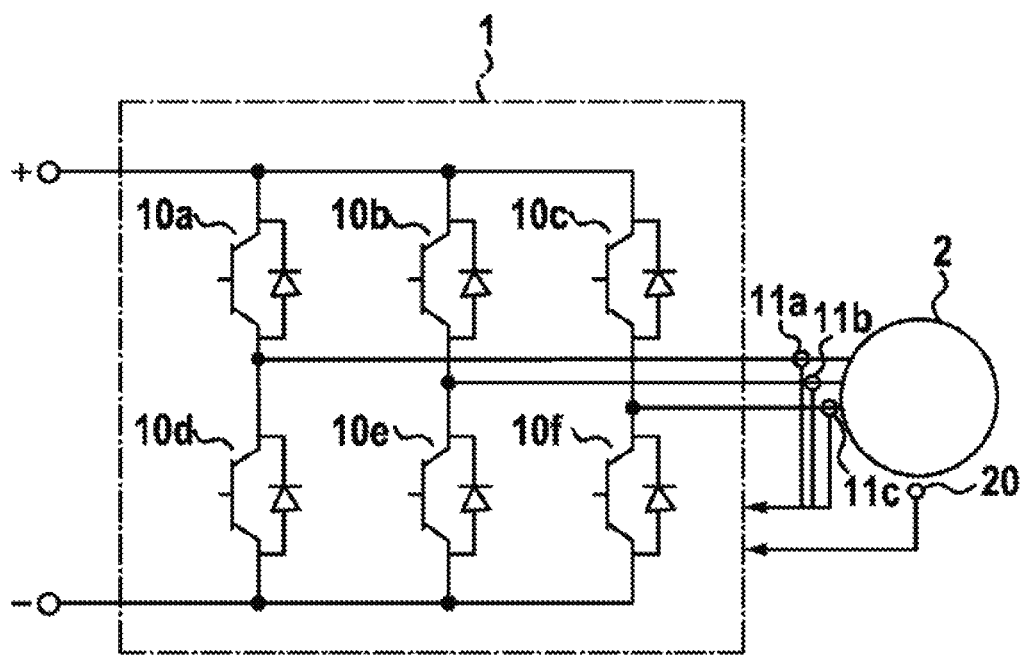
FIG. 4 shows a schematic depiction of an electric drive device according to one exemplary embodiment.

FIG. 4 shows a schematic depiction for an electric drive device comprising an inverter according to one embodiment of the present invention for reducing the transient phase currents when switching from the idling mode to the active short circuit mode. In this case, the inverter 1 is, as previously described, supplied with a DC voltage. In so doing, the voltages at the connections of the electric machine 2 are monitored by means of voltage sensors 11a-11c. If the inverter 1 receives a signal at a request connection A to switch from the idling mode to the active short circuit mode, the voltage signals from the voltage sensors 11a-11c are then subsequently evaluated. The electric machine 2 is then further operated in the idling mode until one of the voltages at the connections of the electric machine 2 has a maximum value according to the amount. At this point in time, the switching elements are then actuated in the inverter 1 such that the connections of the electric machine 2 are electrically connected to one another. In the process, either the upper or the lower three switching elements of a B6 bridge can, for example, be closed as is depicted in FIGS. 2 and 3. In principle, other circuit configurations can, however, be actuated depending on the design of the inverter, which are suited to short circuiting the electric connections of the electric machine 2.

Because a fixed relationship exists between the voltages at the connections of the electric machine 2 and the angular position of the rotor of the electric machine, it is also possible for the voltages at the connections of the electric machine to be inferred from the current angular position of the rotor of the electric machine. Hence, it is also possible additionally or alternatively to the measurement of the voltages at the connections of the electric machine 2 by means of the voltage sensors 11a-11c to ascertain the angular position of the rotor of the electric machine 2 by means of an angle transmitter 20. Based on the angular position of the angle transmitter 20, it is subsequently possible to draw conclusions about the voltages at the connections of the electric machine and thus likewise to determine an angular position or respectively voltage conditions which are suitable for carrying out a switch from the idling mode to the active short circuit mode when minimal transient phase currents are present.

Further options for determining the voltage conditions at the connections of the electric machine (2) are, furthermore, also possible. Hence, the voltage conditions can, for example, also be calculated on the basis of a mathematical modal. As the case may be, further sensor data can also be incorporated into the calculation process in order to accomplish this end.

Figure 5:
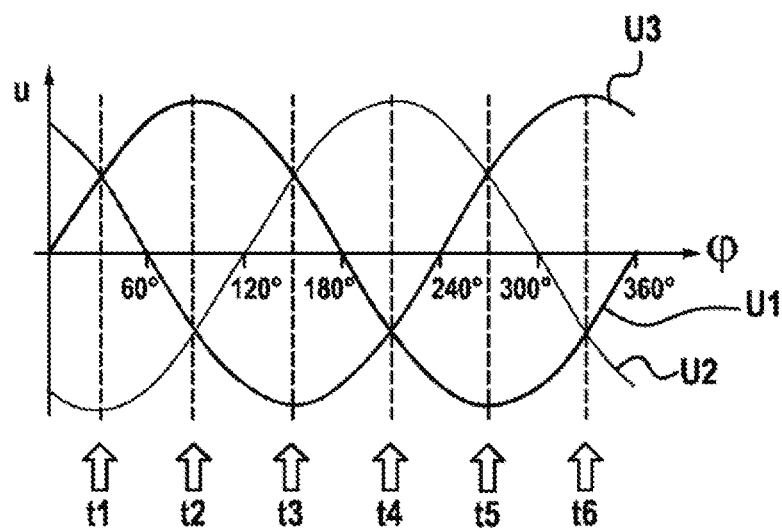
FIG. 5 shows a schematic depiction of a voltage diagram for the voltages in the strands of a three-phase synchronous machine, as said diagram underlies one exemplary embodiment of the present invention.

FIG. 5 shows a schematic depiction of the voltages in the strands of a three-phase synchronous machine and the advantageous switching points in time t1-t6 corresponding thereto for the reduction of the transient phase currents when switching from the idling mode to the active short circuit mode. As can be seen in FIG. 5, exactly six points in time t1-t6 per revolution result in the case of a three-phase synchronous machine, at which an advantageous switch from the idling mode to the active short circuit mode is possible. These advantageous switching points in time t1-t6 are in each case at a maximum or respectively minimum phase voltage of the three voltages at the connections of the electric machine 2, said voltages being in each case phase shifted through 120°. This therefore shows that a particularly advantageous shift from the idling mode to the active short circuit mode can be carried out in a three-phase synchronous machine every 60° of rotation. Because these points in time t1-t6 are already known in advance, the control for the shift from the idling mode to the active short circuit mode can be particularly simply and efficiently implemented without a complicated circuit or respectively logic circuit being required to meet this end.

The request for the switch from the idling mode to the active short circuit mode can originate at any desired source. Such a request can, for example, be provided by a control device of a completely or partially electrically operated motor vehicle. If such a control device detects a fault situation in the motor vehicle which requires a shift from the idling mode to the active short circuit mode, the corresponding request signal can thereupon be transmitted to the inverter 1. Upon arrival of the request signal, the control of the inverter 1 then delays the shift from the idling mode to the active short circuit mode until the previously described requested voltage conditions or respectively a suitable rotor angular position have been achieved. The delays required in these processes are however generally so short that they, even in the case of critical faults, do not lead to any significant delays which could have a negative effect on the operating situation of the total system.

Figure 6:
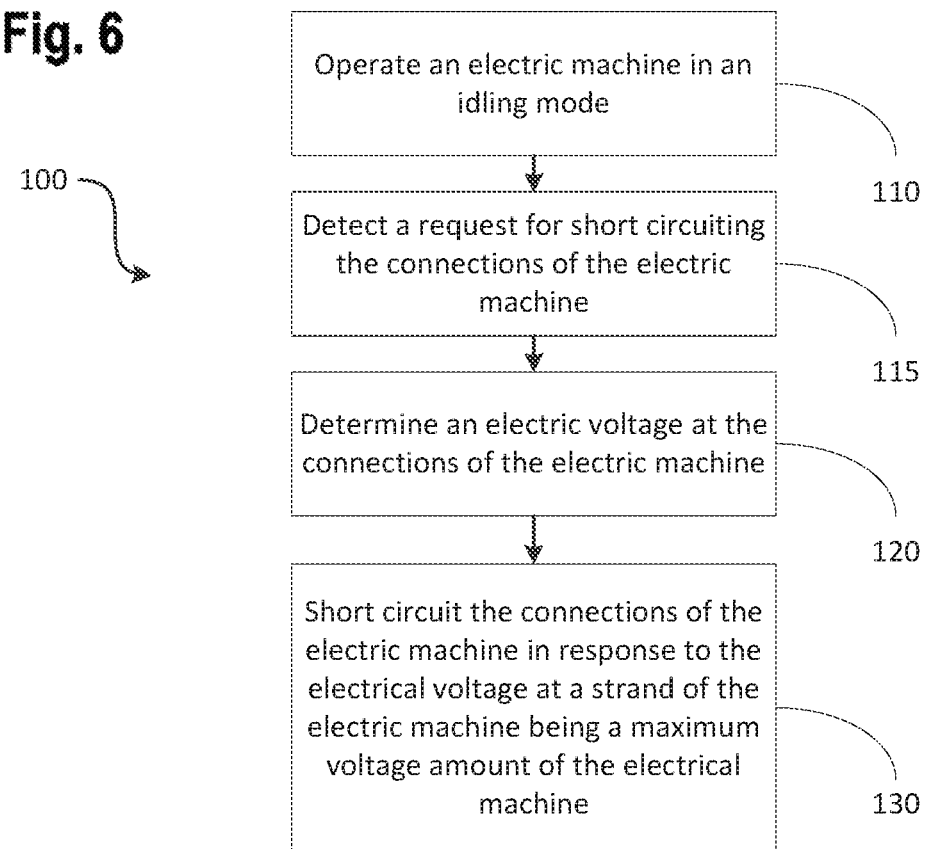
FIG. 6 shows a schematic depiction of a flow diagram for a method, as said method underlies one exemplary embodiment.

FIG. 6 shows a schematic depiction for a flow diagram as said diagram underlies a method 100 for operating an electric machine according to a further exemplary embodiment.

In step 110, an electric machine 2 is initially operated in an idling mode. If a shift is to take place from the idling mode to the active short circuit mode, an electric voltage is then determined at the connections of the electric machine 2 in step 120. In step 130, the connections of the electric machine are subsequently short circuited if the electric voltage has a predetermined value at the connections of the electric machine 2. As already described above, this predetermined value preferably relates to the maximum value according to amount of a voltage of the electric machine 2 that occurs in the idling mode.

In step 115, provision can furthermore be made for a further step which detects the request for short circuiting the connections of the electric machine. In this case, the short circuiting of the connections of the electric machine is delayed upon detecting the request in step 130 until the voltage has the predetermined value at the connections of the electric machine.

In summary, the present invention results in improved switching from the idling mode to the short circuit mode of an electric machine. According to the invention, the switch from the idling mode to the active electric short circuit is delayed until predefined voltage conditions have been reached or until the rotor of the electric machine is in a predetermined position corresponding to the required voltage conditions.

The invention claimed is:

1. A device for operating an electric machine (2), comprising
   an inverter (1) which is designed to electrically separate the connections of the electric machine (2) from one another in an idling mode and to electrically connect the connections of the electric machine (2) to one another in a short circuit mode; and
   a voltage sensor which is designed to detect an electrical voltage at the connections of the electric machine,
   wherein the inverter (1) is furthermore designed to switch from the idling mode to the short circuit mode in response to the electrical voltage at a strand of the electric machine is at a maximum voltage amount of the electric machine (2).

2. The device according to claim 1, comprising a rotary encoder (2) which is designed to detect an angular position of a rotor of the electric machine (2), wherein the electrical voltage at the connections of the electric machine (2) is determined on the basis of the angular position of the rotor of the electric machine (2).

3. The device according to claim 1, wherein the inverter (1) comprises a plurality of semiconductor switches (10a-10f) and wherein the electrical connections are electrically connected to one another via the semiconductor switches (10a-10f) in the short circuit mode.

4. An electric drive device, comprising:
   an electric machine (2); and
   a device according to claim 1.

5. The electric drive device according to claim 4, wherein the electric machine (2) comprises a permanently excited synchronous machine.

6. A method (100) for operating an electric machine (2), comprising the steps:
   operating (110) the electric machine (2) in an idling mode;
   determining (120) an electrical voltage at the connections of the electric machine (2) with a voltage sensor; and
   short circuiting (130) the connections of the electric machine in response to the electrical voltage at a strand of the electric machine being a maximum voltage amount of the electrical machine.

7. The method (6) according to claim 6, comprising a step (115) for detecting a request for short circuiting the connections of the electric machine (2);
   wherein, upon detecting the request, the step (130) for short circuiting the electric machine (2) delays the short circuiting until the voltage has reached the maximum voltage amount of the electric machine at the strand of the electric machine.

* * * * *